(12) United States Patent
Priepke

(10) Patent No.: US 8,528,308 B2
(45) Date of Patent: Sep. 10, 2013

(54) DISC MOWER WITH FOLDING WING FRAME

(75) Inventor: Edward H. Priepke, Lancaster, PA (US)

(73) Assignee: CNH America, LLC, New Holland, PA (US)

( * ) Notice: Subject to any disclaimer, the term of this patent is extended or adjusted under 35 U.S.C. 154(b) by 358 days.

(21) Appl. No.: 12/690,078

(22) Filed: Jan. 19, 2010

(65) Prior Publication Data

US 2011/0173940 A1   Jul. 21, 2011

(51) Int. Cl.
*A01D 34/00* (2006.01)

(52) U.S. Cl.
USPC .................................. 56/15.8; 56/6; 172/311

(58) Field of Classification Search
USPC ......... 56/15.8, 6, 17.21, 15.2, 14.9; 172/311, 172/478, 518; 414/550
See application file for complete search history.

(56) References Cited

U.S. PATENT DOCUMENTS

| | | | |
|---|---|---|---|
| 1,139,751 A | 5/1915 | Brostrom | |
| 1,479,994 A | 1/1924 | Krotz | |
| 2,336,079 A | 12/1943 | Eustis et al. | |
| 2,626,554 A | 1/1953 | Silver et al. | |
| 3,360,053 A | 12/1967 | Doepker | |
| 3,414,064 A * | 12/1968 | Foster | 172/311 |
| 4,211,287 A | 7/1980 | Garrison | |
| 4,319,643 A | 3/1982 | Carter et al. | |
| 4,327,932 A | 5/1982 | Anderson | |
| 4,402,367 A * | 9/1983 | Couser | 172/456 |
| 4,502,545 A * | 3/1985 | Couser | 172/311 |
| 4,660,651 A | 4/1987 | Pfenninger et al. | |
| D298,139 S * | 10/1988 | van Staveren | D15/27 |
| 5,062,260 A * | 11/1991 | Tonutti | 56/380 |
| 5,357,737 A * | 10/1994 | Ermacora et al. | 56/16.4 R |
| 5,598,691 A * | 2/1997 | Peeters | 56/377 |
| 5,685,135 A * | 11/1997 | Menichetti | 56/365 |
| 5,722,222 A | 3/1998 | Walters et al. | |
| 5,752,375 A * | 5/1998 | Tonutti | 56/365 |
| 6,073,431 A | 6/2000 | Osborne et al. | |
| 6,109,012 A * | 8/2000 | Staal et al. | 56/367 |
| 6,561,283 B2 * | 5/2003 | Hundeby | 172/459 |
| 6,837,033 B2 * | 1/2005 | Schlesser et al. | 56/14.9 |
| 6,860,335 B2 * | 3/2005 | Arnett | 172/311 |
| 6,865,873 B2 * | 3/2005 | Menichetti | 56/367 |
| 7,024,844 B2 * | 4/2006 | Schlesser et al. | 56/14.9 |
| 7,073,604 B1 * | 7/2006 | Dobson et al. | 172/311 |
| 7,360,353 B2 * | 4/2008 | Hruska et al. | 56/377 |
| 7,540,139 B2 * | 6/2009 | Rowse et al. | 56/377 |

(Continued)

FOREIGN PATENT DOCUMENTS

| | | |
|---|---|---|
| DE | 003423410 A1 | 1/1985 |
| EP | 001175819 A2 | 1/2002 |
| JP | 408275633 A | 10/1996 |
| WO | 9314619 A1 | 8/1993 |

*Primary Examiner* — Árpád Fábián-Kovács
(74) *Attorney, Agent, or Firm* — Patrick M. Sheldrake

(57) ABSTRACT

A movable frame for connection to a prime mover that supports multiple individual similar implements in a manner similar to the manner each would be singly connected in a trail-behind implement pulled by a prime mover, but maintains relative positioning between the implements sufficiently to enable the multiple implements to function as a single, larger implement. The frame allows individual implements to be positioned generally transversely in an operating position for travel in a first direction providing maximum operating width, and generally longitudinally in a transport position for travel in a direction opposite to the first direction in which the overall with of the implements on the frame is minimized to three meters or less.

17 Claims, 5 Drawing Sheets

(56) References Cited

U.S. PATENT DOCUMENTS

| | | | |
|---|---|---|---|
| 7,581,597 B2 * | 9/2009 | Neudorf et al. | 172/311 |
| 7,596,935 B2 * | 10/2009 | Bollinger et al. | 56/14.9 |
| 7,712,544 B1 * | 5/2010 | Misenhelder et al. | 172/311 |
| 7,726,109 B2 * | 6/2010 | Thompson et al. | 56/15.8 |
| 7,958,707 B2 * | 6/2011 | Thompson et al. | 56/15.8 |
| 8,056,307 B2 * | 11/2011 | Roberge | 56/6 |
| 8,127,861 B2 * | 3/2012 | Meek | 172/311 |
| 2002/0059789 A1 | 5/2002 | Koorn | |
| 2004/0200203 A1 * | 10/2004 | Dow et al. | 56/375 |
| 2008/0314605 A1 | 12/2008 | Degelman et al. | |
| 2009/0107097 A1 * | 4/2009 | Thompson et al. | 56/15.8 |
| 2011/0047948 A1 * | 3/2011 | Thompson | 56/17.1 |

* cited by examiner

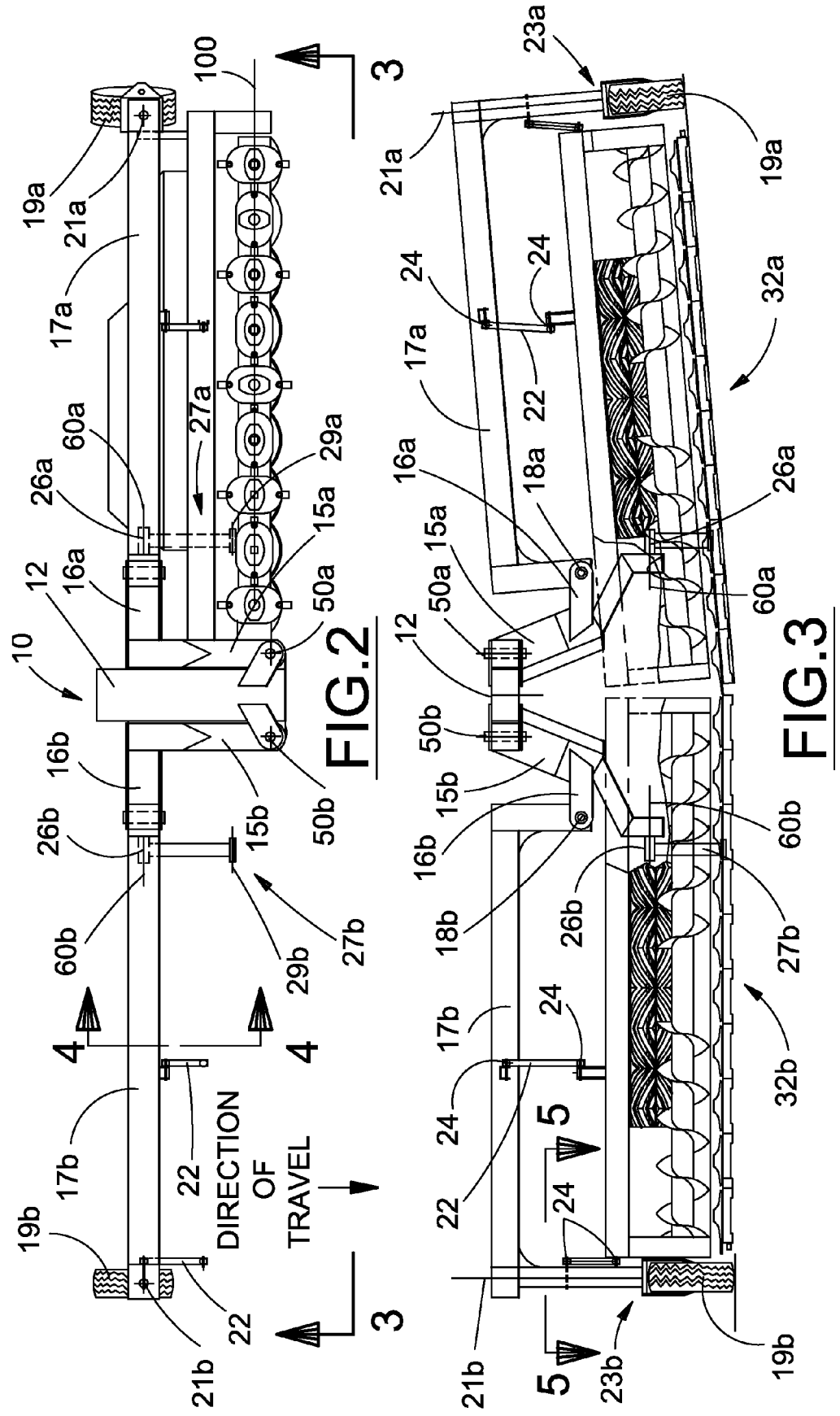

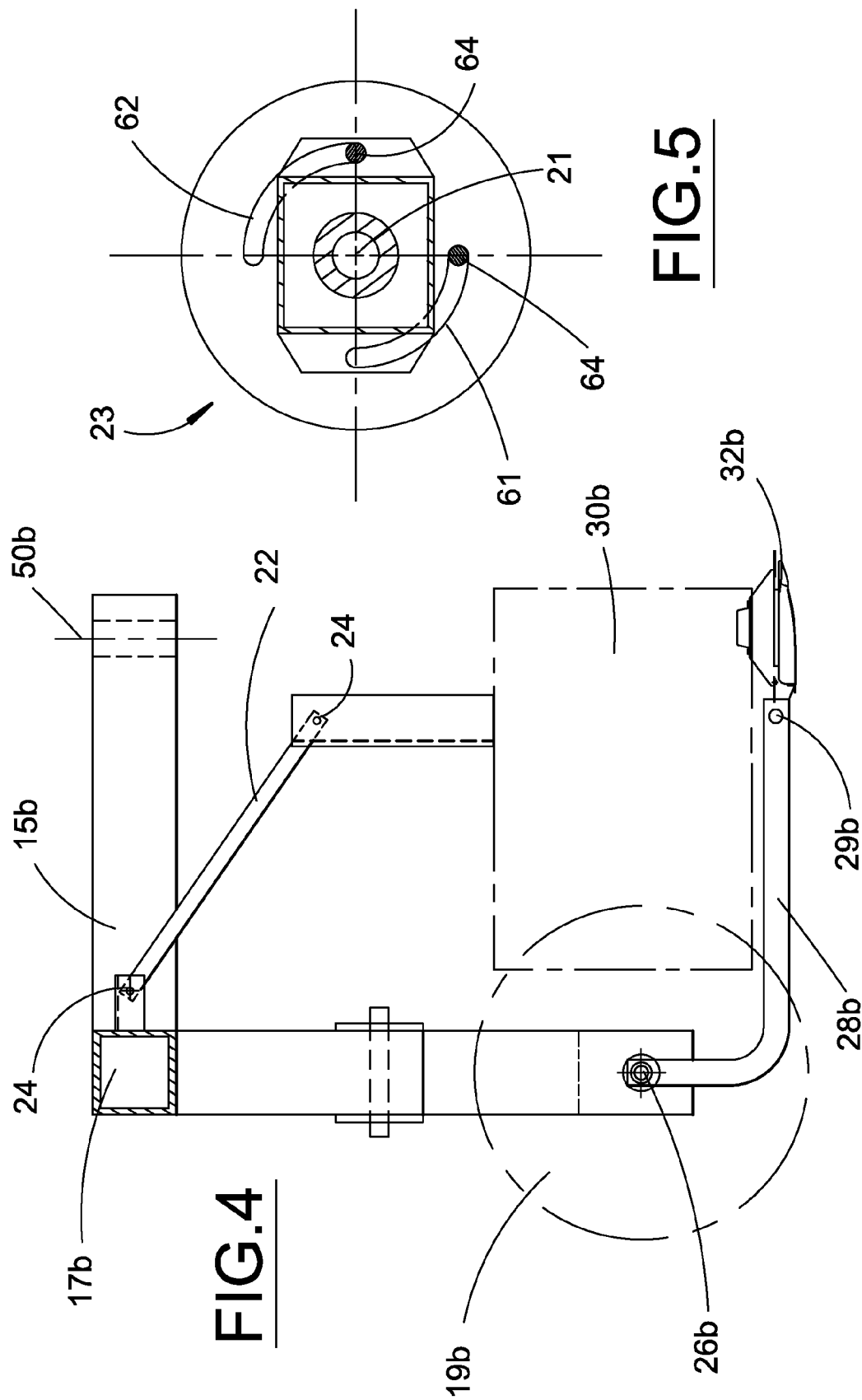

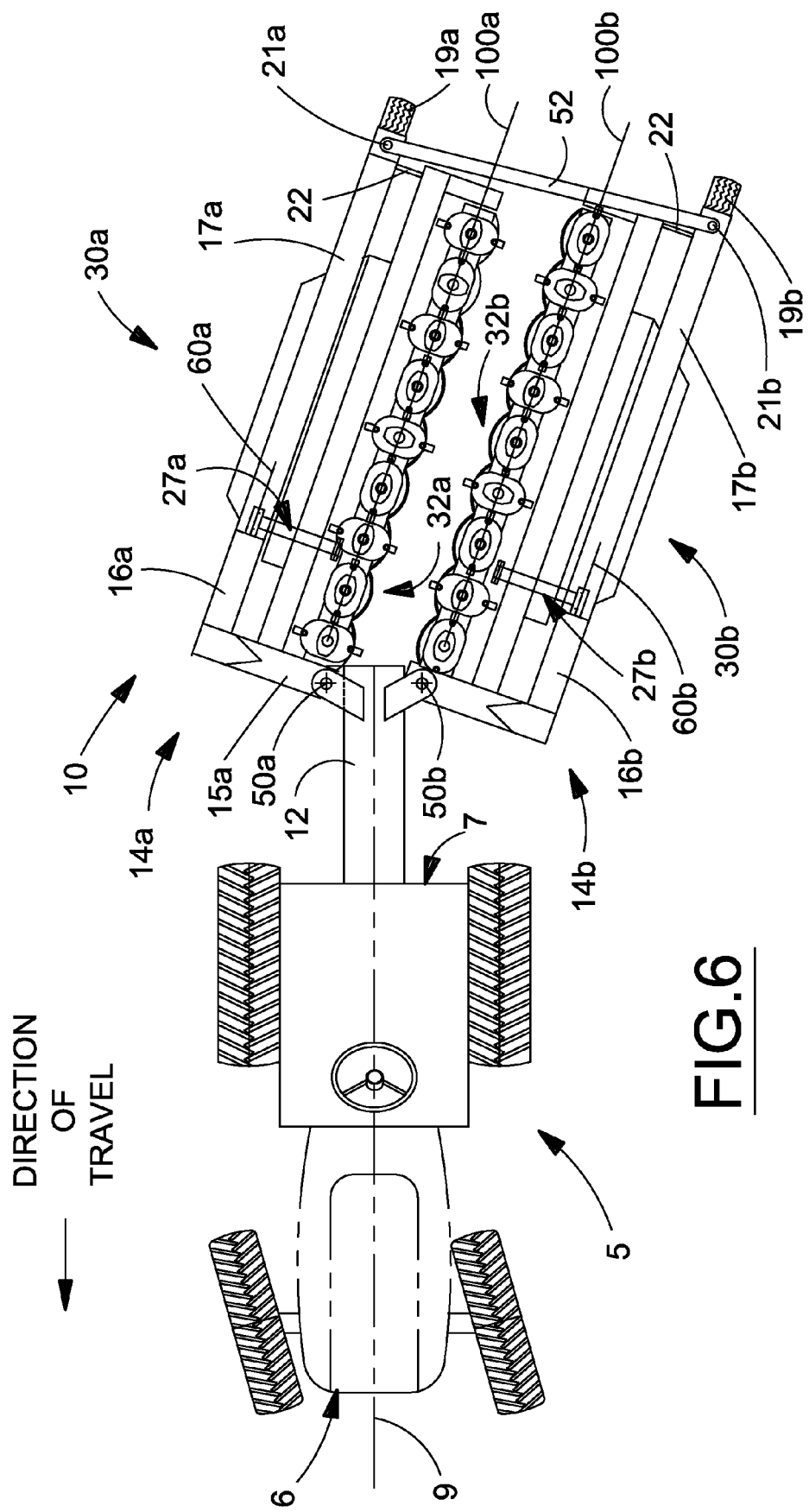

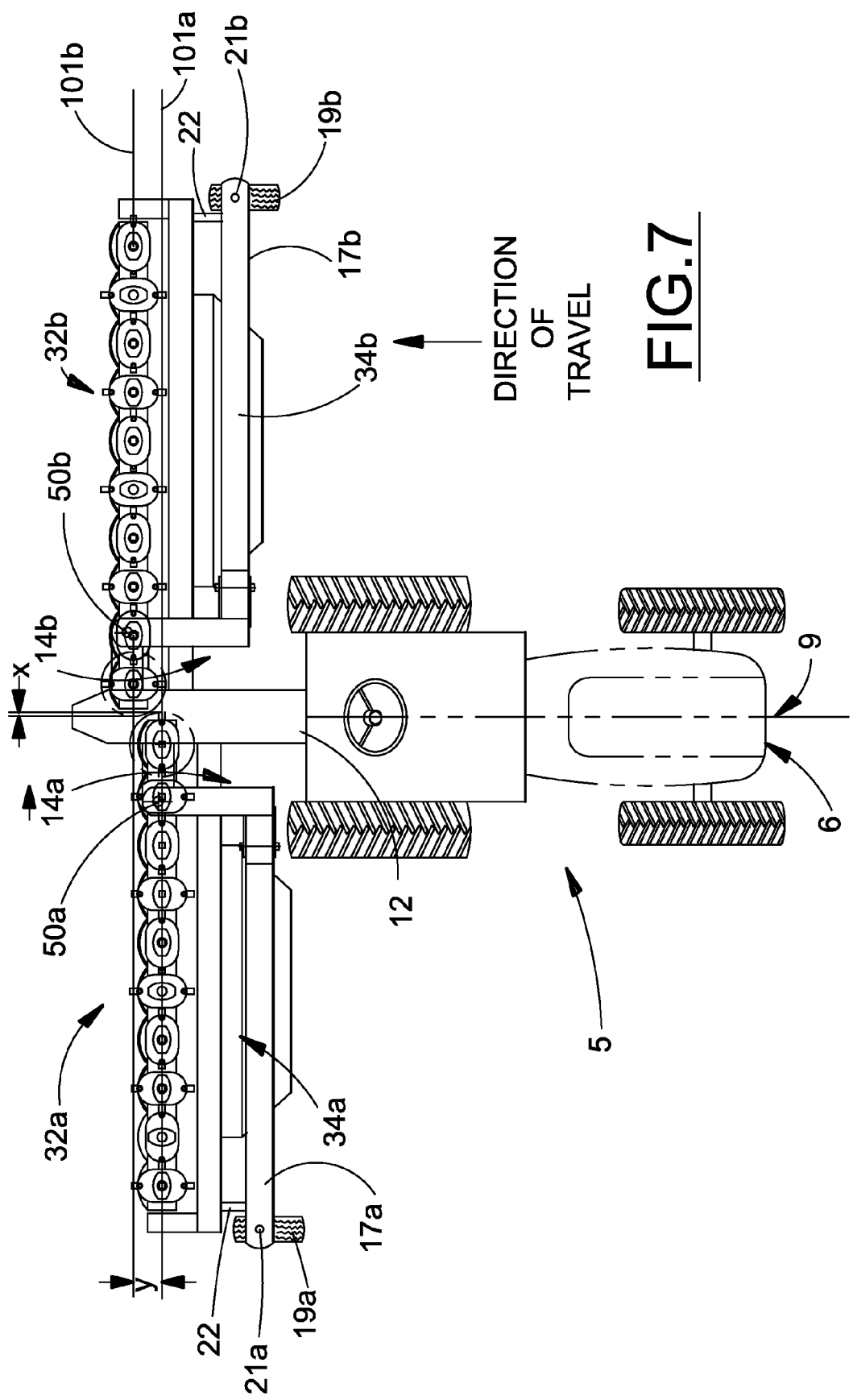

DISC MOWER WITH FOLDING WING FRAME

BACKGROUND OF THE INVENTION

The present invention relates generally to agricultural harvesting machines having multiple mower-conditioner heads, and more particularly relates to a frame mechanism for repositioning the heads between operating and transport configurations.

Agricultural mower-conditioner combinations are well known and include self-propelled and pull-behind types. One common problem involves transporting large capacity machines between fields as the machine capacity is limited by the width of the mower-conditioner unit. Large capacity mower-conditioners are typically equipped with multiple mower-conditioner heads mounted on a frame that allows repositioning of the heads between an operating configuration and a transport configuration. The mower-conditioner heads are often the same or similar head units used in single head machines for production efficiency. When in the operating configuration, the heads may be arranged adjacently such that the line of cutting extends along a single transverse axis, or overlapping wherein the lines of cutting or the heads are staggered with one leading another and a slight overlap in cutting at the juncture of two adjacent heads. Adjacent heads provide a continuous transverse cutting line and to fully utilize available cutting capacity; however, the cutters on both heads must be synchronized to avoid knife interference during operation. Overlapping heads underutilize the full cutting capacity of the cutterbars.

Problems encountered when using multiple heads on a movable frame include maintaining accurate transverse positioning of the cutterbars when heads are adjacently aligned in an operating configuration and maneuverability of the tractor and mower combination when the heads are configured for transport. These problems are magnified when swath and windrow management are addressed in the design.

It would be advantageous to provide a frame arrangement for connecting a multiple head mower-conditioner combination to a tractor that would be enable at least two individual heads to be laterally positioned in an operating configuration with sufficient accuracy to assure complete crop cutting coverage while avoiding interference between the adjacent cutting elements. Further advantages would be realized by a frame arrangement that would position at least two individual heads for transport within a width on par with the width of the tractor to which it is connected. Still further advantages would be realized by a frame arrangement for a multiple head mower-conditioner unit that could be easily adapted for use with other agricultural implements.

SUMMARY OF THE INVENTION

Accordingly, the present invention, in any of the embodiments described herein, may provide one or more of the following advantages:

It is an object of the present invention to provide a frame apparatus for supporting multiple mower-conditioner heads such that the heads may be positioned in an operating position and a transport position.

It is a further object of the present invention to provide a frame apparatus for supporting multiple mower-conditioner heads that is selectively and easily deployable thereby enabling the machine to be easily reconfigured for operation or transport.

It is a further object of the present invention to provide a frame apparatus for supporting multiple mower-conditioner heads adjacent one another wherein the cutting mechanisms of the heads are arranged on a common transverse axis.

It is a further object of the present invention to provide a frame apparatus for supporting multiple mower-conditioner heads wherein the heads are staggered one slightly behind another with a small amount of transverse overlap in the cutting swath.

It is a further object of the present invention to provide a frame apparatus for supporting a pair of large-capacity mower-conditioner heads for maximum operating capacity that may be reconfigured to provide a three meter transport width.

It is a further object of the present invention to provide a frame apparatus for supporting a pair of similar, large-capacity mower-conditioner heads in a manner affording efficient windrow management and avoids windrow placement in the path of the tractor wheels.

It is a still further object of the present invention to provide a frame apparatus for supporting multiple mower-conditioner heads that is adaptable for use with existing mower conditioner head designs to maximize part commonality and reduce production costs.

It is a still further object of the present invention to provide an implement support frame for multiple similar implements capable of partially supporting its own weight to avoid overloading the tractor.

It is a still further object of the present invention to provide a frame for supporting multiple mower-conditioner heads that is easily adaptable for push forward or pull-behind operation with a prime mover.

It is a still further object of the present invention to provide a frame for supporting multiple mower-conditioner heads that is movable between operational and transport positions and capable of maintaining the heads in a generally fixed adjacent relationship when in the operational position.

It is a still further object of the present invention to provide a frame for supporting multiple implements that allows for movement of the individual implements similar to movement afforded a single implement mounting thereby allowing the implements to follow terrain irregularities.

It is a still further object of the present invention to provide a lateral transport system for an agricultural harvester that is durable in construction, inexpensive of manufacture, carefree of maintenance, easily assembled, and simple and effective to use.

These and other objects are achieved in accordance with the instant invention by providing a movable frame for connection to a prime mover that supports multiple individual similar implements in a manner similar to the manner each would be singly connected in a trail-behind implement pulled by a prime mover, but maintains relative positioning between the implements sufficiently to enable the multiple implements to function as a single, larger implement. The frame allows individual implements to be positioned generally transversely in an operating position for travel in a first direction providing maximum operating width, and generally longitudinally in a transport position for travel in a direction opposite to the first direction in which the overall with of the implements on the frame is minimized to three meters or less.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial plan view of the implement support frame of FIG. 1 showing the relationship of the wing frames, wing extensions, and connected implements as the tractor and implement encounter a terrain undulation;

FIG. 3 is a section view from FIG. 2 taken along cut line 3-3 showing the relationship of the wing frames, wing extensions, and connected implements of the present invention FIG. 4 is a section view from FIG. 2 taken along cut line 4-4 detailing the controlling suspension arms of the present invention used to maintain lateral positioning of the connected implements during operation FIG. 5 is a partial plan view from FIG. 3 taken along cut line 5-5 showing the castor limiter mechanism of the present invention;

FIG. 6 is a plan view of the bi-directional agricultural tractor of FIG. 1 wherein the tractor is moving in the front-forward direction while turning and the support frame is positioned for mower transport showing the frame response to the turn; and FIG. 7 is a partial plan view of the implement support frame showing an alternate implement alignment on the support frame.

DESCRIPTION OF THE PREFERRED EMBODIMENT(S)

Figure 1:
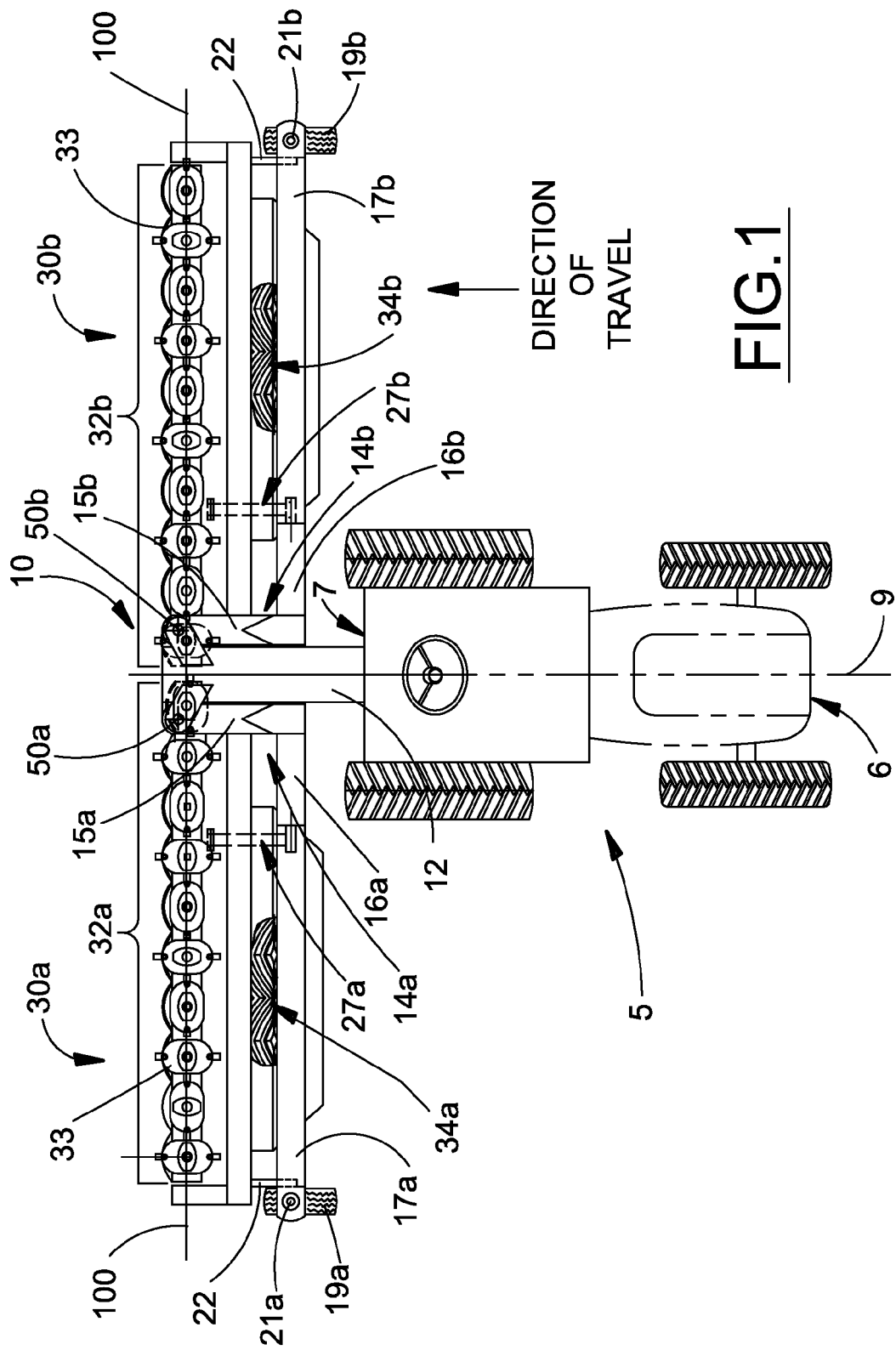
FIG. 1 is a plan view of a bi-directional agricultural tractor of the type on which the present invention is useful showing an implement support frame and a pair of similar mower-conditioner heads connected thereto wherein the tractor is moving in the rear-forward direction and the support frame is positioned for mower operation.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures. Alpha designations following a numeric designator are used to distinguish the two similar parts, typically right side/left side on the generally symmetrical invention; reference to the numeric designator alone indicates the either part.

Referring to FIG. 1 wherein a tractor 5 is shown having a front end 6 and a rear end 7 with an implement support frame 10 connected to the rear end 7. A pair of similar implements, mower-conditioner heads 30a, 30b in this instance, is operably connected to the support frame 10 and configured for travel in the direction shown. Tractor 5 is commonly referred to as a bi-directional tractor, that is one capable of convenient operation in either direction generally along its longitudinal axis 9. In FIG. 1, tractor 5 is shown operating in the rear-forward direction. Support frame 10 is movable between an operating position, shown in FIG. 1, and a transport position (shown in FIG. 6). When support frame 10 is in the operating position, the mower-conditioner heads 30 are arranged so that their operating widths (defined by the cutterbars 32a, 32b) extend transverse to the direction of travel along operational axis 100. Rotational power is delivered from the tractor 5 to each mower conditioner head 30 by a power-take-off (PTO) shaft extending from the tractor 5 to an intermediate gearbox (not shown) and then to each connected mower head in a conventional manner.

Those skilled in the art will recognize the usefulness of the instant invention with mower-conditioner implements as well as a variety of other implements for which multiple individual implements may be combined into larger integrated implements. As such, this invention is not limited to use with mower-conditioner heads, but such implements are used in this description to illustrate the advantages of the present invention. For background information on the structure and operation of an exemplar rotary disc cutterbar and mower-conditioner heads, reference is made to U.S. Pat. No. 5,778, 647, issued to McLean et al., the descriptive portions thereof being incorporated herein by reference.

Each mower-conditioner head 30 is provided with a crop cutting mechanism, referred to as a cutterbars 32a, 32b, each having a plurality of transversely spaced disc cutter members 33 operable to sever standing crop material by an impact action. The individual disc cutter members 33 are interconnected by a driveline to coordinate the rotational position of each cutter mechanism thereby preventing contact between the knives of adjacent cutting members. The adjacent cutterbars 32a, 32b are also coordinated in motion so that the in two adjacent disc cutter members at the interface between the adjacent heads do not inadvertently come into contact. In the implements shown, a conditioning mechanism 34a, 34b is mounted in each head 30 rearwardly of the cutterbars 32 to receive and condition crop material severed by the cutterbars. Mower-conditioner heads of this type may be connected to and propelled by a tractor 5 specifically adapted for use with such headers, commonly referred to as a self-propelled windrower, or as is the case herein, one or more heads 30 may be connected to form an integrated mower-conditioner implement for propulsion by a bi-directional agricultural tractor 5. Such heads 30 and many similar implements include provisions for movably suspending the head so that it will float across ground irregularities while maintaining a generally consistent height above the ground, such as necessary for cutting a standing crop. To this end, a series of suspension links 22 having spherical bearing end connectors 24 at each end are provided to connect each implement 30 to a respective side of the support frame 10 so that the implement is supported yet allowed finite articulation movement for terrain following. The suspension links 22 also enable the connected heads to be selectively raised and lowered for transport and operation, respectively, by a lift apparatus (not shown) which is well known in the art. The support frame 10 of the present invention is configured to utilize the implement suspension pickup points commonly used on production heads to enable efficient manufacture of the heads for use in single or multiple head combinations.

Mower-conditioner heads having operating widths on the order of 3 to 5 meters are common; the movable support frame 10 provides a convenient method for increasing machine capacity (operating width) using a combination of current production mower-conditioner heads 30. By positioning a pair of mower-conditioner heads 30 side-by-side, the effective cutting width of the machine is doubled. The movable support frame 10 allows the mower-conditioner heads to be repositioned for transport by rotating their operating width axis to one parallel with the travel direction of the tractor thereby reducing the width of the assembly for over-the-road or other transport in which machine width is a limiting consideration.

In order to maximize the effective cutting width of the mower-conditioner heads 30, the cutterbars 32a, 32b from each head 30 are aligned along a common axis 100 and the cutting action of each is synchronized so that the two cutterbars 32a, 32b function as a single, integrated unit. Aligning the cutterbar in this manner maximizes utilization of the cutterbar and is generally easier for an operator to observe and control. Positioning the heads 30a, 30b adjacently requires that the relative lateral positioning of the heads be closely maintained to prevent the adjacent cutterbars 32a, 32b from making inadvertent contact while maintaining the cutting swaths sufficiently close to prevent gaps in the crop cutting coverage. Aspects of the present invention which enable precise lateral positioning of the implements are discussed later herein. An alternative arrangement, shown in FIG. 7 staggers the heads one slightly ahead of the other which allows the paths of the cutterbars 32a, 32b to overlap slightly, preferably on the order of one-quarter of a meter. The advantages of a staggered arrangement are that the cutterbars need not be synchronized and the relative lateral positioning between the two heads is not as critical compared to an adjacent arrangement.

Now referring to FIGS. 1 though 4 collectively, support frame 10 comprises a main frame 12 configured for connection to tractor 5, preferably via a three-point hitch apparatus. A pair of movable wing frames 14a, 14b is each connected to the main frame 12 by generally vertically oriented pivot connections 50a, 50b which enable the wing frames to swing in relation to the main frame. In one embodiment, each wing frame 14 is a generally L-shaped structure having the pivot connection 50 disposed adjacent to an end of a first leg 15a, 15b; the second leg 16a, 16b of each wing frame 14 connects to an elongate frame extension 17a, 17b. The leg extensions of the wing frames enable the connected implements 30 to be maintained spaced-apart when the wing frames are pivoted to the transport position. The wing frames 14 include provisions to be secured in an operating position to prevent movement relative to the main frame 12, as shown in FIG. 1, to provide a stable support structure for the connected implements 30 during operation. Articulating connectors 18a, 18b are provided between the second leg 16b, 16b and the frame extension 17a, 17b to allow a limited amount of generally vertical movement of the outboard ends of the frame extensions 17a, 17b relative to the wing frames 14 for movement over uneven terrain. Frame extensions 17 extend a sufficient length to span the width of the implements to be connected.

Wheels 19a, 19b, are provided, one at each outboard end of wing frame extensions 17a, 17b to support the ends of frame extensions. Wheels 19, in conjunction with the articulated connectors 18, allow the support frame 10 sufficient flexibility so that the attached implements may generally follow the contours of the ground without unduly stressing the support frame. Referring to FIG. 5 in conjunction with FIGS. 1 through 4, the connection of wheels 19 to the wing frame extensions 17 includes a generally vertically aligned castor pivot 21 which allows the wheels 19 to change direction responsive to the direction of the tractor 5. During operation, the wheels are generally allowed 360 degrees of movement about the castor pivot axis 21. Each wheel castor pivot includes a castor limiter mechanism 23 which allows the directional pivoting movement of the wheels 19 to be limited or even to fix the direction of the wheels in a single position. The limiters are employed during transitions of the support frame between operating and transport positions. In one embodiment, first and second quadrant limiters 61, 62 are arranged generally symmetrically about the castor pivot axis 21, each limiter configured to allow movement of the castor through approximately 90 degrees when a stop pin 64 is inserted. The first quadrant limiter 61, when engaged by stop pin 64, limits pivoting of the wheel 19 to forward and outward (relative to the operational direction) for the transition from operation to transport. The second quadrant limiter 62, when engaged by a stop pin 64 limits pivoting of the wheel 19 to forward and outward (relative to the transport direction) for the transition from transport to operation. Engaging both quadrant limiters 61, 62 with stop pins 64 fixes the castor position and is used to lock the wheels in place for when the support frame is propelled in the transport direction.

While the majority of the suspension links 22 feature multi-axial connectors at each end, preferably spherical bearings 24 or ball joints that allow full freedom of articulation of the heads 30 within the frame 10 from flotation over the terrain or from lifting, the present invention also includes a pair of controlling suspension arms 27a, 27b, one mounted on each wing frame using a precision cylindrical bearing 26a, 26b which limits motion of the controlling suspension arms 27a, 27b to pivoting about control axis 60a, 60b to move in a generally vertical plane perpendicular to the transverse direction of the cutterbars 32a, 32b. The free end connectors 29a, 29b of the controlling suspension arms 27 are connected to the mower heads 30 using a ball joint to permit lateral tilting/articulation of the heads. However, the controlling arm free end connectors 29a, 29b should be positioned as near as practical to the cutterbar center, both in the fore-aft and vertical directions, to minimize transverse displacement of the cutterbars 32 as the heads 30 articulate in the suspension. The controlling suspension arms 27a, 27b and bearings 26a, 26b must be structurally adequate to allow only minimal deflection from transverse forces on the cutterbar so that the adjacent cutterbars will remain accurately positioned relative to each other.

The common problem for known large capacity mower-conditioner frames is incorporating a suitable anchor point on the support frame for the controlling suspension arm of each adjacent mower head while still allowing the heads to be repositioned for transport. The present invention overcomes this limitation by mounting the bearings 26a, 26b for the controlling suspension arms 27a, 27b on the folding wing frames 14a, 14b that can be positioned for either operation or transport. When positioned for operation, the wing frames 14 are secured to become integrally fixed to the main frame 12. The remaining suspension links 22 are also connected to the wing frames extensions 17a, 17b so that the folding motion of the wing frames 14 rotates the entire extension frame 17 and head assembly 30 approximately 90 degrees in a horizontal plane for transport.

Now referring to FIG. 6 wherein the implement support frame 10 is shown in the transport position. Tractor 5 is shown operating in the front-forward direction with the implement support frame 10 and connected implements 30 trailing behind. Wing frames 14 are pivoted approximately 90 degrees so that the implements 30 are arranged with their transverse widths generally parallel to the direction of travel thereby reducing the width of the implements 30 and support frame 10 for more convenient transport. Folding of the heads is generally in the same direction as the normal operating direction. In this configuration, wing frames 14 are not secured in a fixed position relative to main frame 12, but are allowed to pivot about pivot axes 50 in response to the trailing motion of the implements 30 and wing frames 14. A connecting link 52 connects the outboard ends of the wing frame extensions 17 thus forming a parallelogram frame enabling the wing frames and extensions to move in unison and trail the tractor as would a conventional trailer. Wheels 19, normally allowed to move in a trailing caster action when the frame 10 is configured for operation, are secured in position generally aligned with the wing frame extensions 17. FIG. 6 best illustrates the changes in relative position of the elements of support frame 10 during a turning maneuver performed while in the transport configuration.

In FIG. 7, an alternate embodiment of the implement support frame 10 is shown wherein implements 30 are staggered so that the cutterbars 32a, 32b are arranged one slightly ahead of the other when the wing frames 14 are in the operating position, aligning on staggered axes 101a, 101b. This stagger is illustrated by the dimension "y". The staggered arrangement of the heads allows the paths of the cutterbars 32a, 32b to overlap slightly during operation, illustrated as dimension "x" and preferably on the order of one-quarter of a meter. While the overlap represents a slight reduction in cutting efficiency relative to the adjacent cutterbars described above, the cutterbar lateral positioning is not as critical compared to an adjacent arrangement. As such, inclusion of the controlling suspension arms 27 is not essential in this embodiment as a slight degree of lateral displacement of the heads 30 during operation is permissible. Remaining elements of the support frame 10 are as described above as are the operational and transport positions of the wing frames 14.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A movable frame for connecting a plurality of like implements to an agricultural tractor, the moveable frame comprising:
a main frame configured for connection to the tractor and movable by the tractor in an operational direction and a generally opposite transport direction;
a first wing frame and a second wing frame each pivotally connected to said main frame at first and second swing joints, for rotation about generally vertical axes between an operating position and a transport position;
first and second elongate wing extensions having respective first and second pivot ends and free ends, said first and second pivot ends connected to said first and second wing frames, respectively, said first and second wing extensions extending generally transverse to the tractor from opposing sides of said main frame when said first and second wing frames are in said operating position, said first and second wing extension extending generally longitudinally to the tractor when said first and second wing frames are in said transport position wherein said first and second wing extensions are each connected to said first and second wing frames, respectively, by a generally horizontally aligned pivot joint that enables said first and second free ends of said wing extension to move generally vertically relative to said main frame as support wheels connected to the wing extensions encounter undulations in the ground;
first and second suspension systems, each connecting one of the plurality of implements to said first and second wing extensions, respectively, each said suspension system configured to allow at least vertical movement between the implement and the connected wing extension and wherein the implement includes a cutterbar; and
elongate first and second controlling suspension arms each pivotally connected at one end to respective first and second wing frames for rotation about an axis generally parallel to an operating length of the respective implements, an opposing end of each of said first and second controlling suspension arms being connected to one of the plurality of implements whereby said first and second controlling suspension arms maintain lateral spacing between the plurality of connected implements within a pre-determined limit.

2. The movable frame of claim 1, further comprising first and second support wheels, one wheel being disposed at each said free end of said wing extensions by a pivoting castor connection.

3. The movable frame of claim 2, further comprising a castor limiter mechanism disposed on each of said first and second castor wheels, each said castor limiter configured to selectively prevent pivoting movement of said pivoting castor connection or limit pivoting of said pivoting castor connection to a pre-determined range.

4. The movable frame of claim 2, further comprising a removable elongate trailing link for connecting said first and second free ends when said wing frames are in said transport position thereby maintaining a fixed spacing between said first and second free ends, wherein said first and second wing frames are secured in position when in said operational position to prevent relative movement between said wing frames and said main frame and further wherein said first and second wing frames are allowed to move about respective said pivot axes when in said transport position, pivotal movement of said wing frames being caused by changes in direction of travel of the tractor during movement in the transport direction.

5. The movable frame of claim 1, wherein the wing frames have a first and second portion, each first portion having the pivotal connection to the main frame and the second portion having the connection to the wing frame, wherein the first portions are angled such that when in an operating position a sidewall of the first portion of the wing frame abuts a sidewall of the main frame and when in a transport position the first portions form an offset between the two implements.

6. The movable frame of claim 1, wherein the first and second suspension systems both include suspension links having spherical connections to allow movement between the implement and the wing frames a vertical and lateral direction with respect to the direction of travel.

7. The movable frame of claim 1, wherein the control linkages are mounted for movement within generally vertical planes perpendicular to the traverse direction of the implement.

8. A movable frame for connecting a plurality of like implements to an agricultural tractor in a functionally cooperative manner when propelled across the ground by the tractor, the moveable frame comprising:

a main frame configured for mounting to the tractor and movable by the tractor in an operational direction and a generally opposite transport direction;

a first wing frame and a second wing frame each pivotally connected to opposing lateral sides of said main frame for rotation about generally vertical axes between an operating position and a transport position;

first and second elongate wing extensions connected to said first and second wing frames, respectively, said first and second wing extensions extending generally transverse to the tractor from opposing sides of said main frame when said first and second wing frames are in said operating position, said first and second wing extension extending generally longitudinally to the tractor when said first and second wing frames are in said transport position;

first and second suspension systems, each for connecting one of the plurality of implements to said first and second wing extensions, respectively, each having at least one linkage for connecting at least one of the implements to the wing extension wherein at least one connector on the at least one linkage is configured to permit vertical movement between the implement and the connected wing extension; and elongate first and second controlling suspension arms connected at one end to said first and second wing frames and at their opposing end to a respective one of the plurality of implements, wherein each controlling suspension arms has a pivotal connector permitting movement about a rotational axes generally parallel to an operating length of the implement;

wherein said operating position of said wing frames orients the plurality of implements in a side-by-side relationship for operation when propelled in said operational direction, said first and second controlling suspension arms maintaining lateral spacing between the plurality of connected implements within a pre-determined limit thereby enabling adjacent functional alignment of the plurality of implements.

9. The movable frame of claim 8, further comprising first and second support wheels, one wheel being disposed at each said free end of said wing extensions, said first and second support wheels connected to said first and second wing extensions, respectively, by a pivoting castor connection.

10. The movable frame of claim 9, further comprising a castor limiter mechanism disposed on each of said first and second castor wheels, each said castor limiter configured to selectively prevent pivoting movement of said pivoting castor connection or limit pivoting of said pivoting castor connection to a pre-determined range and wherein the range is set dependent on the position of the wing frames.

11. The movable frame of claim 10, wherein said first and second wing extensions are each connected to said first and second wing frames, respectively, by a generally horizontally aligned pivot joint that enables said first and second free ends of said wing extension to move generally vertically relative to said main frame as said support wheels encounter undulations in the ground.

12. The movable frame of claim 8, further comprising a removable elongate trailing link for connecting said first and second free ends when said wing frames are in said transport position thereby maintaining a fixed spacing between said first and second free ends, wherein said first and second wing frames are secured in position when in said operational position to prevent relative movement between said wing frames and said main frame and further wherein said first and second wing frames are allowed to move about respective said pivot axes when in said transport position, pivotal movement of said wing frames being caused by changes in direction of travel of the tractor during movement in the transport direction.

13. The movable frame of claim 8, wherein the plurality of implements further comprises adjacently aligned first and second cutterbars for severing a standing crop from the ground and said pre-determined limit enables said first and second cutterbars to function as an integral cutterbar without leaving appreciable unsevered standing crop material between said cutterbars.

14. A method for positioning a plurality of similar implements on a movable frame mounted to a bi-directional agricultural tractor in a functionally cooperative manner comprising the steps:

providing a main frame configured for mounting to the tractor and movable by the tractor in an operational direction and a generally opposite transport direction;

providing a first wing frame and a second wing frame each pivotally connected to opposing lateral sides of the main frame at first and second swing joints, each said swing joint enabling movement of the first and second wing frames about a generally vertical axis between an operating position and a transport position;

providing first and second elongate wing extensions connected to the first and second wing frames, respectively, the first and second wing extensions extending generally transverse to the tractor from opposing sides of the main frame when the first and second wing frames are in the operating position and generally longitudinally to the tractor when the first and second wing frames are in the transport position;

providing first and second suspension systems, each for connecting one of the plurality of implements to the first and second wing extensions, respectively, each suspension system configured to allow supported implement movement with respect to the ground and the wing extensions;

providing first and second support wheels, one wheel being disposed at each free end of the wing extensions;

providing generally horizontally aligned first and second pivot joints for connecting the first and second wing extensions to the first and second wing frames, respectively;

providing elongate first and second controlling suspension arms connected at one end to the first and second wing frames, respectively, in a manner limiting movement to pivotal motion about respective first and second positional axes, an opposing end of each of the first and second controlling suspension arms being connected to a respective one of the plurality of implements whereby the first and second controlling suspension arms maintain lateral spacing between the plurality of connected implements within a pre-determined limit;

changing a direction of travel and operation of the tractor to the transport direction including reversing the direction of an operator station of the tractor rotating the wing frames inwardly into the transport position; and wherein when in the transport direction the bi-directional tractor pulls the implements and in the operation direction the bi-direction tractor pushes the implements.

15. The method of claim 14, wherein the plurality of implements further comprises adjacently aligned first and second cutterbars for severing a standing crop from the ground and the pre-determined limit enables the first and second cutterbars to function as an integral cutterbar without leaving appreciable unsevered standing crop material between the cutterbars.

16. The method of claim 14, further comprising selectively limiting the rotation of the left and right support wheel for pulling the implement in the transport.

17. The method of claim 14, further comprising elongate first and second controlling suspension arms each pivotally connected at one end to respective first and second wing frames for rotation about an axis generally parallel to an operating length of the respective implements, an opposing end of each of said first and second controlling suspension arms being connected to one of the plurality of implements whereby said first and second controlling suspension arms maintain lateral spacing between the plurality of connected implements within a pre-determined limit.

* * * * *